US011923631B2

(12) United States Patent
Cusano et al.

(10) Patent No.: US 11,923,631 B2
(45) Date of Patent: Mar. 5, 2024

(54) SEALED CABLE CONNECTOR, MANUFACTURING METHOD AND USE THEREOF

(71) Applicant: JOHNSON ELECTRIC ASTI S.R.L., Turin (IT)

(72) Inventors: Michele Cusano, Asti (IT); Donato Montesano, Asti (IT)

(73) Assignee: JOHNSON ELECTRIC ASTI S.R.L., Turin (IT)

( * ) Notice: Subject to any disclaimer, the term of this patent is extended or adjusted under 35 U.S.C. 154(b) by 65 days.

(21) Appl. No.: 17/499,144

(22) Filed: Oct. 12, 2021

(65) Prior Publication Data

US 2022/0029334 A1 Jan. 27, 2022

Related U.S. Application Data

(63) Continuation of application No. PCT/EP2020/060194, filed on Apr. 9, 2020.

(30) Foreign Application Priority Data

Apr. 12, 2019 (IT) ........................ 102019000005734

(51) Int. Cl.
*H01R 43/24* (2006.01)
*H01R 13/405* (2006.01)
(Continued)

(52) U.S. Cl.
CPC ......... *H01R 13/405* (2013.01); *H01R 13/516* (2013.01); *H01R 13/5205* (2013.01);
(Continued)

(58) Field of Classification Search
CPC ................ H01R 13/405; H01R 13/516; H01R 13/5205; H01R 13/521; H01R 13/5216;
(Continued)

(56) References Cited

U.S. PATENT DOCUMENTS 7,070,460 B1 * 7/2006 Nagano ................ H01R 13/405 439/736
9,954,337 B2 * 4/2018 Kao ................... H01R 13/5845
(Continued)

FOREIGN PATENT DOCUMENTS

CN 101826683 A 9/2010
JP H09134754 A 5/1997
(Continued)

*Primary Examiner* — Truc T Nguyen
(74) *Attorney, Agent, or Firm* — Aird & McBurney LP

(57) ABSTRACT

The invention relates to a sealed cable connector, including electric cables; an electrically insulating housing; electrical terminals, each of the electrical terminals having an end portion that is electrically connected to an end portion of a corresponding electric cable; the housing having a frame forming a cavity that extends in a z-direction, wherein connected end portions of the electric cables and the electrical terminals are provided within in the cavity of the frame; wherein the electrical terminals have a planar shape in the cavity and are oriented in the x-direction and the z-direction, in that the housing is molded onto the connected electric cables and the electrical terminals, and in that an electrically isolating material is injected into the cavity such that it seals the connected end portions of the electric cables and the electrical terminals. A manufacturing method and use of the sealed cable connector is also provided.

11 Claims, 4 Drawing Sheets

(51) Int. Cl.
*H01R 13/516* (2006.01)
*H01R 13/52* (2006.01)

(52) U.S. Cl.
CPC ....... *H01R 13/521* (2013.01); *H01R 13/5216* (2013.01); *H01R 43/24* (2013.01); *H01R 2201/26* (2013.01)

(58) Field of Classification Search
CPC .... H01R 43/24; H01R 2201/26; H01R 4/183; H01R 13/50; H01R 13/719
See application file for complete search history.

(56) References Cited

U.S. PATENT DOCUMENTS

| | | | | |
|---|---|---|---|---|
| 11,394,138 | B2 * | 7/2022 | Shimizu ................. | H01R 13/58 |
| 2009/0186506 | A1 * | 7/2009 | Chen ...................... | H01R 43/24<br>29/883 |
| 2017/0110218 | A1 * | 4/2017 | Wakabayashi ....... | H01R 9/2416 |
| 2020/0295479 | A1 * | 9/2020 | Carrozzo, Jr. ......... | H01R 43/20 |

FOREIGN PATENT DOCUMENTS

| | | | |
|---|---|---|---|
| JP | H11312560 | A | 11/1999 |
| JP | 2002276951 | A | 9/2002 |
| JP | 2007172940 | A | 7/2007 |
| JP | 2015056438 | A | 3/2015 |
| JP | 2017130444 | A | 7/2017 |
| JP | 2019036528 | A | 3/2019 |

* cited by examiner

SEALED CABLE CONNECTOR, MANUFACTURING METHOD AND USE THEREOF

CROSS REFERENCE TO RELATED APPLICATIONS

This non-provisional patent application is a continuation application of PCT Application No. PCT/EP2020/060194, filed on Apr. 9, 2020, which claims priority to Italian Patent Application No. 102019000005734, filed on Apr. 12, 2019, all of which are incorporated herein by reference in their entirety.

TECHNICAL FIELD

The invention relates to a sealed cable connector, a manufacturing method and a use thereof. The sealed cable connector is particularly for electrically connecting a device in a vehicle.

BACKGROUND

Known cable connectors comprise an electrically insulating housing which supports a plurality of electrical terminals and a plurality of cables connected to electrical terminals. The cables are inserted into the housing through a plurality of openings. A plurality of sealing rings are fitted to the cables and inserted into the openings to seal the openings.

However, external humidity or fluid is still capable to enter the housing when the sealing rings are detached from the openings or any one of the cables is cut. Therefore, known cable connectors are not satisfactory sealing the electrical connection between the electrical terminals and the cables off against environmental impacts like humidity or fluids, e.g. water unless they are comparatively large in size.

SUMMARY

It is the object of the present invention to provide a sealed cable connector that seals the delicate electrical connection off in a reliable manner but at the same time has a size not larger than known cable connectors.

According to one aspect of the present invention, a sealed cable connector is provided, comprising a plurality of electric cables; an electrically insulating housing having a connection portion that is pluggable and unpluggable in a x-direction to and from a mating connector, a plurality of electrical terminals that are mechanically connecting to the housing, each of the electrical terminals having an end portion that is electrically connected to an end portion of a corresponding electric cable; the housing having a frame forming a cavity that extends in a z-direction and is delimited by the housing in the x-direction and a y-direction, whereas the y-direction extends perpendicular to the x-direction and whereas the z-direction extends perpendicular the x-direction and the y-direction, wherein connected end portions of the electric cables and the electrical terminals are provided within in the cavity of the frame; characterized in that the electrical terminals have a planar shape in the cavity and are oriented in the x-direction and the z-direction, the housing is molded onto the connected electric cables and the electrical terminals, and an electrically isolating material is injected into the cavity such that it seals the connected end portions of the electric cables and the electrical terminals.

Preferably, the electric cables are electrically connected to the electrical terminals by welding.

Preferably, the electrically isolating material injected into the cavity is a resin.

Preferably, an upper cover and a lower cover are clipped onto the frame to close the cavity, the upper cover having an injection hole for injecting the electrically isolating material into the cavity and an air outlet hole.

Preferably, the frame has a first sidewall and a second sidewall which are opposite to each other and extend in the y-direction and the z-direction, a third sidewall and the fourth sidewall which are opposite to each other and extend in the x-direction and the z-direction, and the electrical terminals are oriented parallel to the third sidewall or the fourth sidewall.

Preferably, at least one anti-interference filter is housed in the cavity and is electrically connected to a pair of the electrical terminals by crimping.

According to another aspect of the present invention, a manufacturing method for a sealed cable connector comprises the steps of:

a) connecting end portions of a plurality of electric cables to end portions of a plurality of corresponding electrical terminals;
b) molding an electrically insulating housing onto the connected electric cables and the electrical terminals, the electrically insulating housing having a connection portion that is pluggable and unpluggable in a x-direction to and from a mating connector and having a frame with a cavity extending in a z-direction to house the connected end portions of the electric cables and the electrical terminals, the cavity being delimited by the housing in the x-direction and a y-direction, whereas the y-direction extends perpendicular to the x-direction and whereas the z-direction extends perpendicular the x-direction and the y-direction, and the electrical terminals have a planar shape in the cavity and are oriented in the x-direction and the z-direction; and
c) injecting an electrically isolating material into the cavity so to seal the connected end portions of the electric cables and the electrical terminals.

Preferably, the manufacturing method further comprises a step prior to step (c) of mounting an upper cover and a lower cover to two opposite sides of the cavity, respectively.

According to still another aspect of the present invention, a use of the above described sealed cable connector is provided, for electrically connecting a device in a vehicle.

Preferably, the device is a cooling fan module.

The electrically insulating housing of the sealed cable connector of the present invention is molded onto the connected electric cables and electrical terminals, and the connected end portions of the electric cables and the electrical terminals are sealed by the electrically isolating material, so the sealed cable connector has a reliable sealing. In addition, the electrical terminals are oriented in a xz-direction, so that an arrangement of the electrical terminals along the y-direction can be compacted, and therefore a size of the cavity is minimized, the amount of electrically isolating material is minimized, and the sealed cable connector has an overall size not larger than known cable connectors.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE EMBODIMENTS

Figure 1:
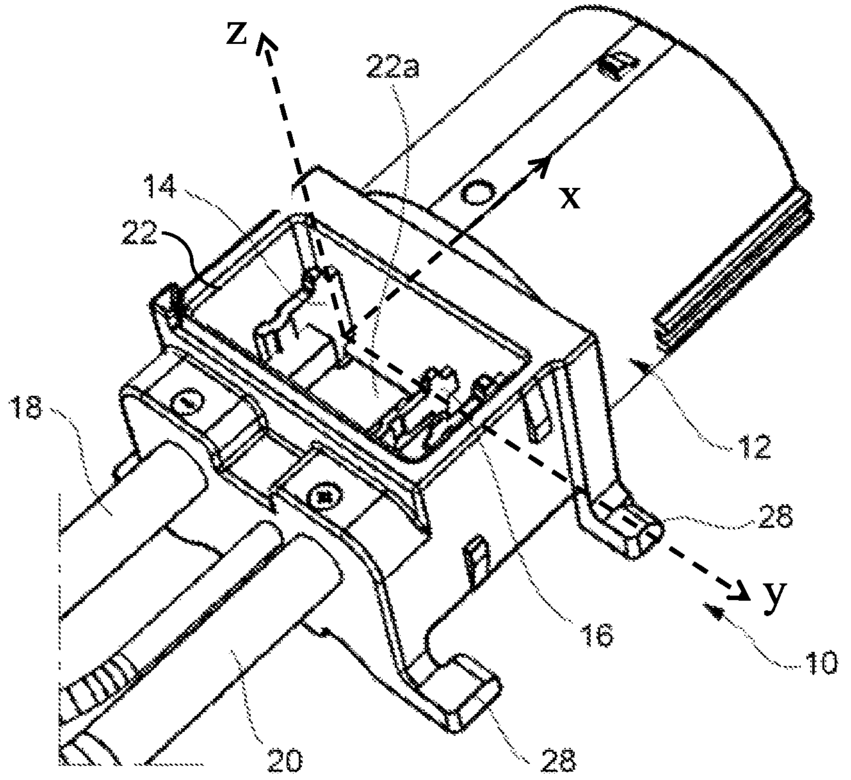
FIG. 1 is a schematic perspective view of a sealed cable connector according to a first embodiment of the present invention, wherein a cavity defined by an electrically insulating housing of the sealed cable connector is visible, inside which the connected end portions of the electric cables and the corresponding electrical terminals are accommodated.
Figure 2:
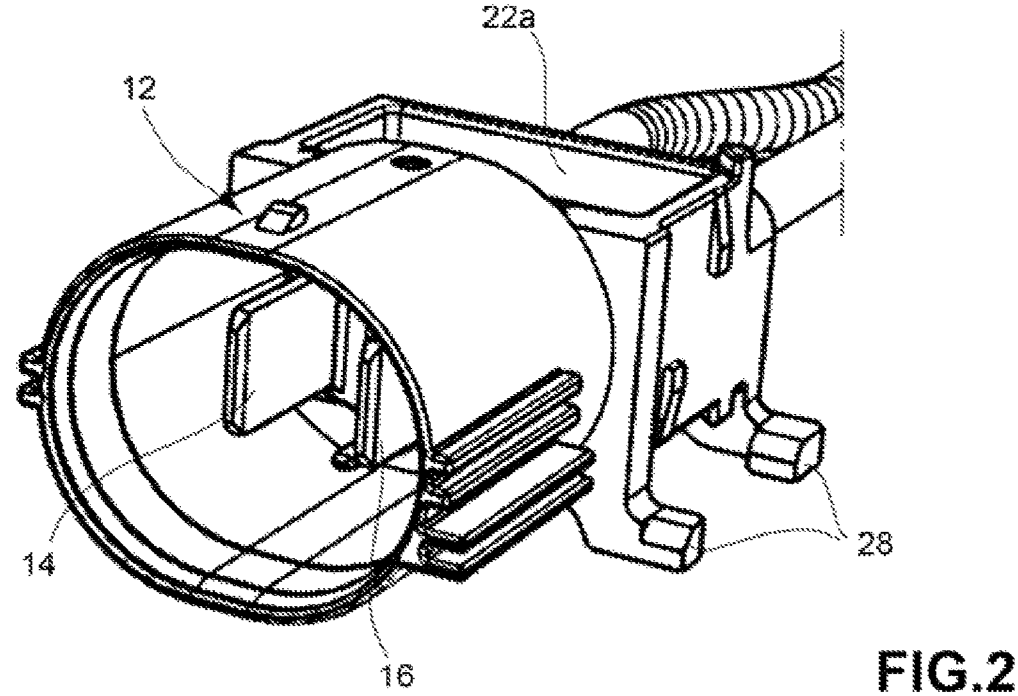
FIG. 2 is a schematic perspective view of the connector shown in FIG. 1, viewed from another aspect.
Figure 3:
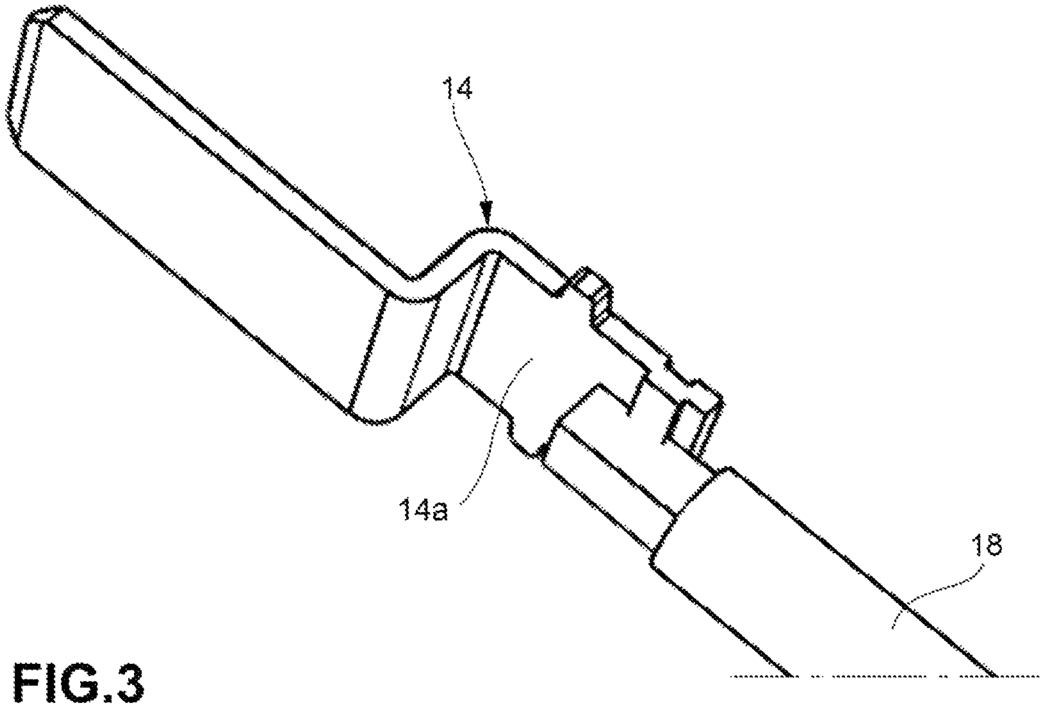
FIG. 3 is an enlarged view of a connection region of an electric cable and a corresponding electrical terminal shown in FIG. 1.
Figure 4:
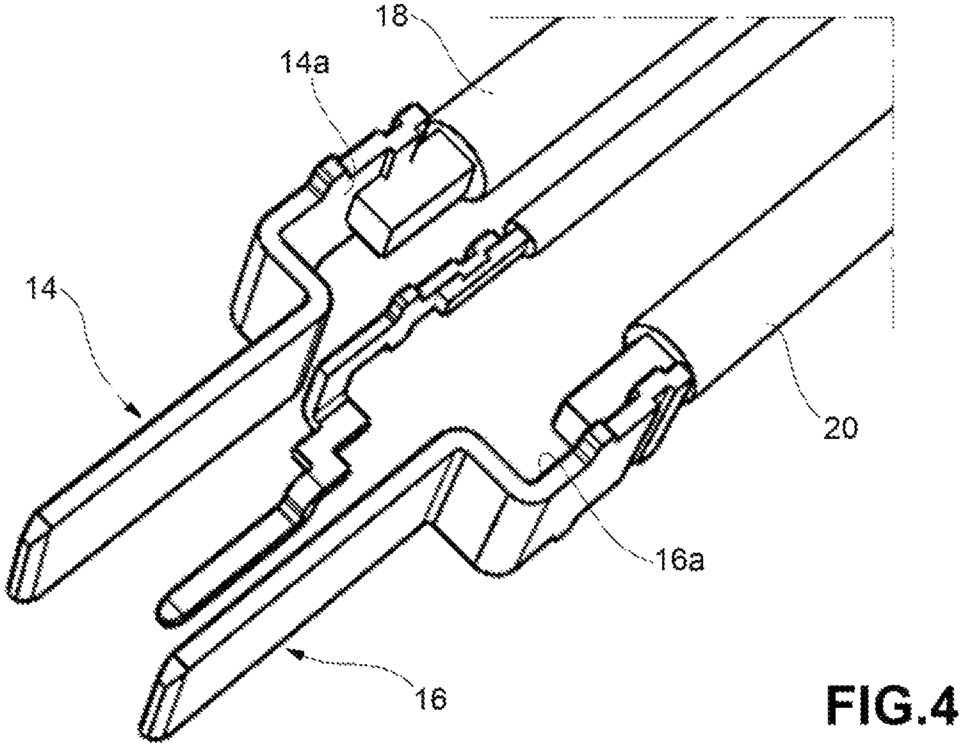
FIG. 4 is a schematic perspective view of an arrangement of the electrical terminals connected to the corresponding electric cables shown in FIG. 1.
Figure 5:
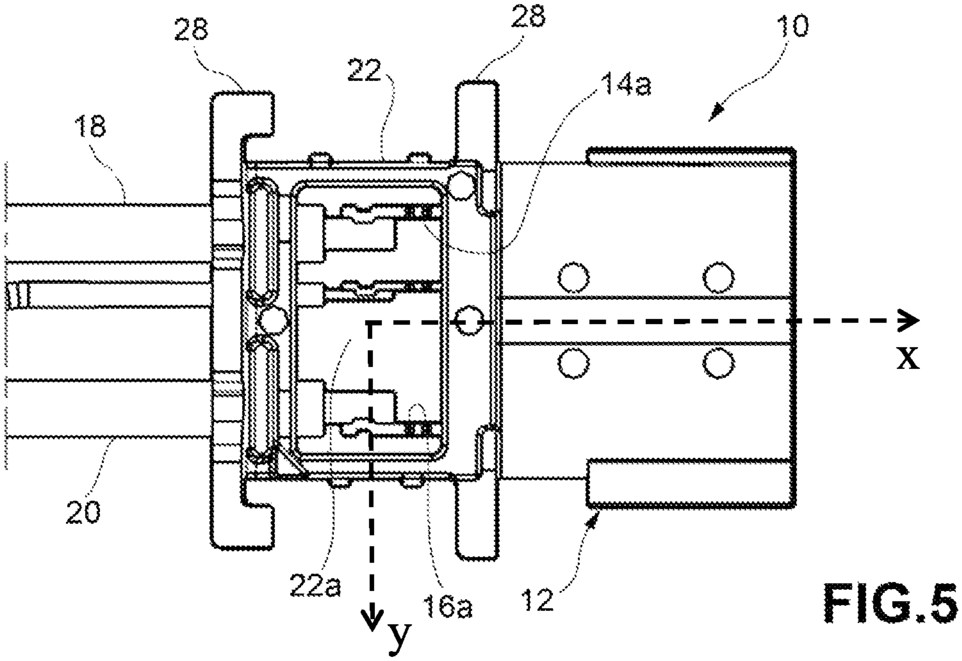
FIG. 5 is a top view of the sealed cable connector of FIG. 1.

The subject matter will be described in conjunction with the accompanying drawings and the preferred embodiments. The described embodiments are only a few and not all of the embodiments of the present disclosure. All other embodiments obtained by those ordinarily skilled in the art based on the embodiments of the present disclosure without any creative efforts fall within the protection scope of the present disclosure. It is to be understood that, the drawings are provided for reference only and are not intended to be limiting of the invention. The dimensions shown in the drawings are only for convenience of illustration and are not intended to be limiting.

Referring to FIGS. 1 to 5, a sealed cable connector 10 according to the first embodiment of the present invention is illustrated, which is used for electrically connecting a device (not shown) in a vehicle, to transmit a power source and/or a control signal to the device. The device may be a cooling fan module, in particular a motor driving the cooling fan module.

The sealed cable connector 10 comprises a plurality of electric cables 18, 20 and a plurality of electrical terminals 14, 16. Each electrical terminal 14, 16 has an end portion electrically connected to an end portion of a corresponding electric cable 18, 20, preferably by welding.

The cartesian coordinate system xyz is defined in the FIG. 1. The x-direction means a pluggable or unpluggable direction of the sealed cable connector 10. The y-direction means a vertical direction perpendicular to the x-direction. The z-direction means a direction perpendicular to the xy-direction.

The sealed cable connector 10 further includes an electrically insulating housing 12 having a connection portion that is pluggable and unpluggable in the x-direction to and from a mating connector (not shown), and a frame 22 defining a cavity 22*a* that extends in the z-direction. The connected end portions of the electric cables 18, 20 and the electrical terminals 14, 16 are housed in the cavity 22*a*.

The electrically insulating housing 12 is molded onto the connected electric cables 18, 20 and the electrical terminals 14, 16, so as to form an integral structure.

An electrically isolating material is injected into the cavity 22*a*. The electrically isolating material may be a synthetic resin, which is solidified in the cavity 22*a* such that it seals the end portion of the electric cables (18, 20) to the end portion of the electrical terminals (14, 16) from the environment of the sealed cable connector 10.

The electrical terminals 14, 16 have a planar shape in the cavity 22*a* and are oriented in the xz-direction, so that the arrangement of the electrical terminals along the y-direction can be compacted, and therefore a size of the cavity 22*a* is minimized, the amount of electrically isolating material is minimized, and the sealed cable connector 10 has an overall size not larger than known cable connectors. In addition, the xz-orientation allows for arranging the electrical terminals 14, 16 in a stacking direction without jeopardizing the minimal insulation clearance between neighboring electrical terminals 14, 16, and helps to avoid air bubbles during the injection molding process of the electrically isolating material into the cavity 22*a*.

Preferably, the frame 22 has a first sidewall (not labeled) and a second sidewall (not labeled) which are opposite to each other and extend in a yz-direction, a third sidewall (not labeled) and the fourth sidewall (not labeled) which are opposite to each other and extend in the xz-direction, and the electrical terminals 14, 16 are oriented parallel to the third sidewall or the fourth sidewall.

Figure 6:
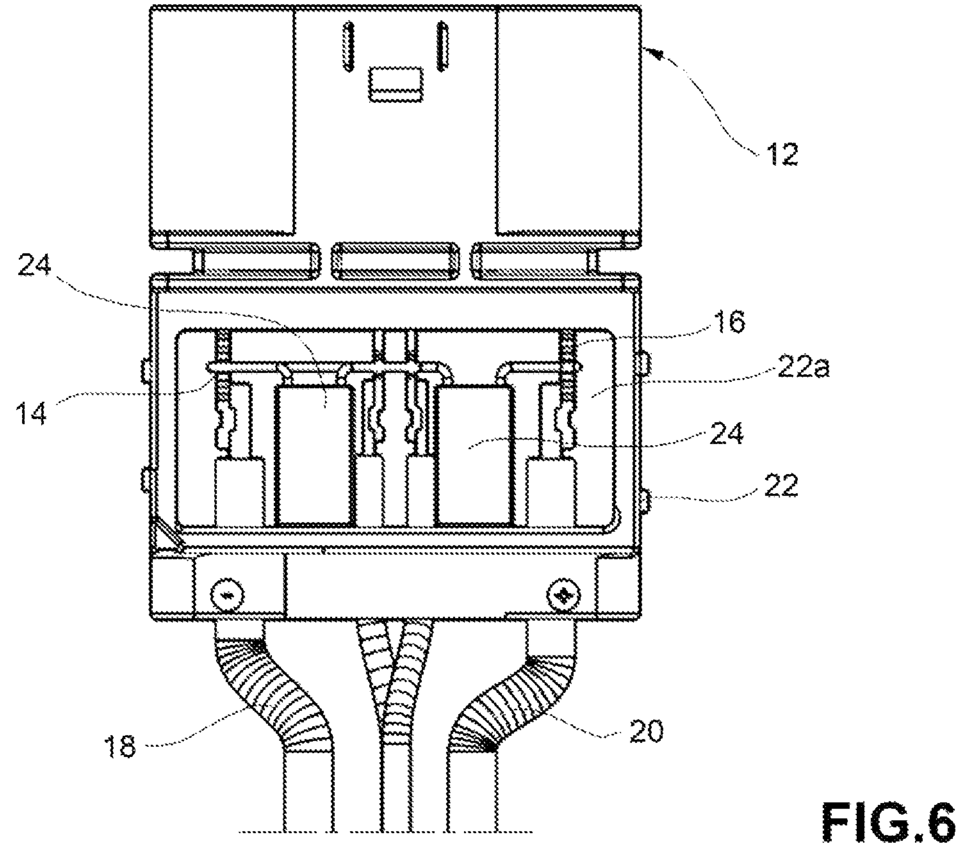
FIG. 6 is a schematic top view of a sealed cable connector, according to a second embodiment of the present invention.

Referring to FIG. 6, a sealed cable connector according to a second embodiment of the present invention is illustrated. At least one anti-interference filter element 24 against electromagnetic interference is housed in the cavity 22*a* and is electrically connected to a pair of electrical terminals 14, 16. The filter element 24 is preferably a capacitor. Preferably, the filter element 24 is connected to the corresponding electrical terminals 14, 16 by crimping, since the electrical terminals 14, 16 are oriented in the xz-direction.

Figure 7:
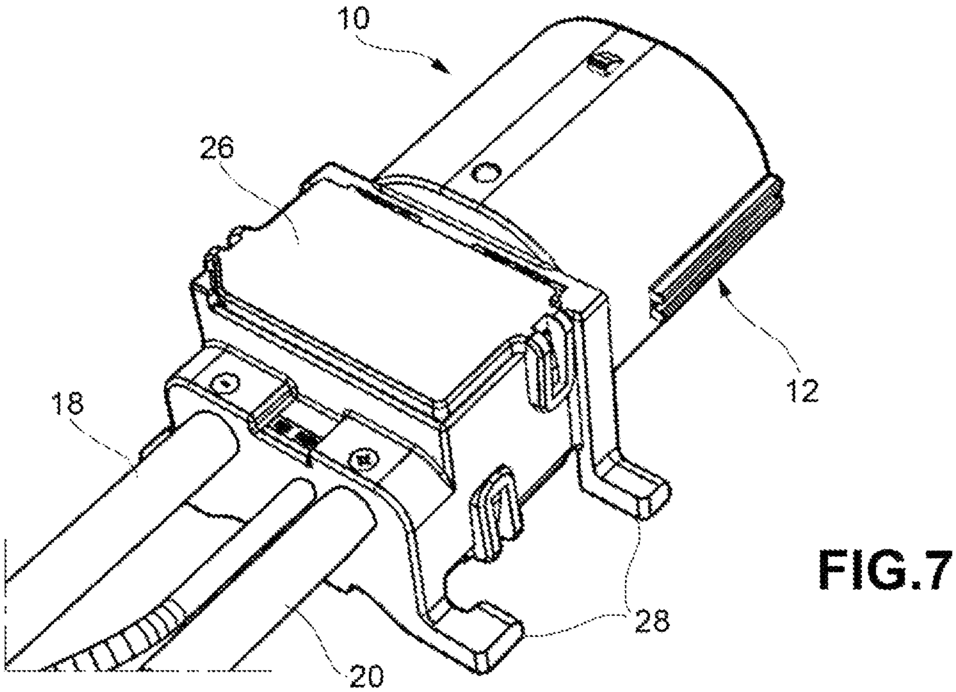
FIG. 7 is a schematic perspective view of a sealed cable connector according to a third embodiment of the present invention.
Figure 8:
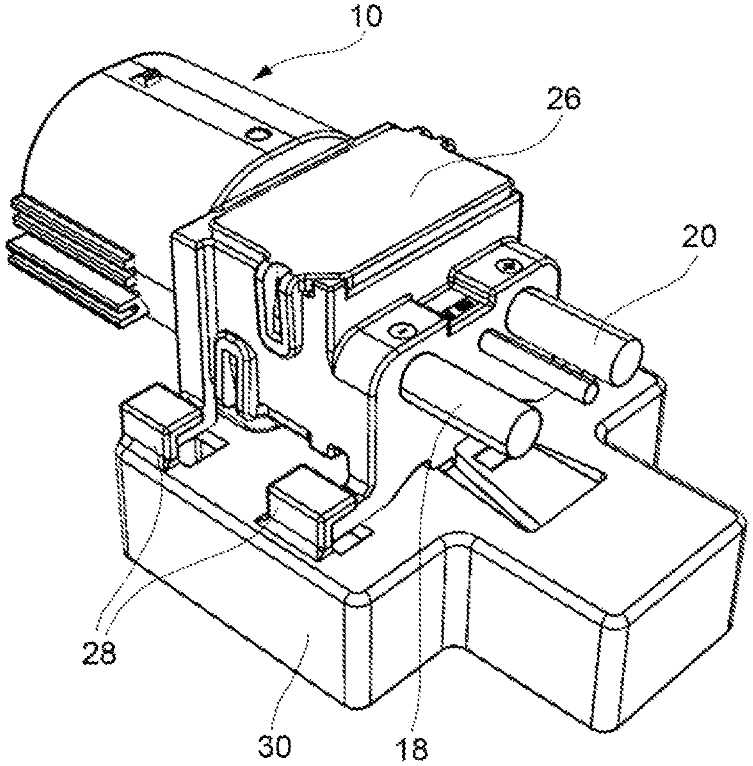
FIG. 8 illustrates the sealed cable connector of FIG. 7, in a condition of coupling to a support.

Referring to FIGS. 7-8, a sealed cable connector according to a third embodiment of the present invention further includes an upper cover 26 and a lower cover respectively fixed to, preferably clipped onto two opposite sides of the housing 12 to close the cavity 22*a*. In an alternative embodiment, the cavity 22*a* has a bottom wall, so that lower cover is not needed.

Preferably, the upper cover 26 has an injection hole (not shown) suitable for injecting the electrically isolating material into the cavity 22*a*, and an air outlet hole, to prevent air bubbles from being trapped in the electrically isolating material.

The frame 22 has a plurality of protruding formations 28 projecting outwards from the frame 22, each of which is slidingly mounted to a corresponding groove of a support 30.

The present invention further provides a manufacturing method of the sealed cable connector, comprising the steps of:

a) connecting, preferably welding the end portions of a plurality of electric cables 18, 20 to the end portions of corresponding electrical terminals 14, 16;
b) molding an electrically insulating housing 12 onto the connected electric cables 18, 20 and the electrical terminals 14, 16, the electrically insulating housing 12 being pluggable and unpluggable in the x-direction to and from a mating connector and having a frame 22 with a cavity 22*a* extending in the z-direction to house the connected end portions of the electric cables 18, 20 and the electrical terminals 14, 16, the electrical terminals 14, 16 having a planar shape in the cavity 22*a* and are oriented in a xz-direction; and c) injecting an electrically isolating material into the cavity 22*a* so to seal the connected end portions of the electric cables 18, 20 and the electrical terminals 14, 16.

Preferably, the manufacturing method further includes a step, prior to step (c), of mounting an upper cover 26 and a lower cover respectively to two opposite sides of the frame 22 to close the cavity 22*a*.

Preferably, the step c) is carried out by injecting the electrically isolating material through an injection hole formed in the top cover 26.

The present invention further provides a use of the sealed cable connector described in the above embodiments, which is for electrically connecting a device in a vehicle. The device may be a cooling fan module, in particular a motor for driving the cooling fan module.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A sealed cable connector (10), comprising:

a plurality of electric cables (18, 20);

an electrically insulating housing (12) having a connection portion that is pluggable and unpluggable in a x-direction to and from a mating connector;

a plurality of electrical terminals (14, 16) that are mechanically connecting to the housing (12), each of the electrical terminals (14, 16) having an end portion that is electrically connected to an end portion of a corresponding electric cable (18, 20);

the housing (12) having a frame (22) forming a cavity (22*a*) that extends in a z-direction and is delimited by the housing (12) in the x-direction and a y-direction, whereas the y-direction extends perpendicular to the x-direction and whereas the z-direction extends perpendicular the x-direction and the y-direction, wherein connected end portions of the electric cables (18, 20) and the electrical terminals (14, 16) are provided within in the cavity (22*a*) of the frame (22);

wherein, the electrical terminals (14, 16) have a planar shape in the cavity (22*a*) and are oriented in the x-direction and the z-direction, the housing (12) is molded onto the connected electric cables (18, 20) and the electrical terminals (14, 16), an electrically isolating material is injected into the cavity (22*a*) to seal the connected end portions of the electric cables (18, 20) and the electrical terminals (14, 16), and an upper cover (26) and a lower cover are respectively fixed to two opposite sides of the frame (22) to close the cavity (22*a*), the upper cover (26) having an injection hole for injecting the electrically isolating material into the cavity (22*a*) and an air outlet hole.

2. The sealed cable connector according to claim 1, wherein the electric cables (18, 20) are electrically connected to the electrical terminals (14, 16) by welding.

3. The sealed cable connector according to claim 1, wherein the electrically isolating material injected into the cavity (22*a*) is a resin.

4. The sealed cable connector according to claim 1, wherein the z-direction extends from one of the upper cover (26) and the lower cover towards the other of the upper cover (26) and the lower cover.

5. The sealed cable connector according to claim 1, wherein the frame (22) has a first sidewall and a second sidewall which are opposite to each other and extend in the y-direction and the z-direction, a third sidewall and the fourth sidewall which are opposite to each other and extend in the x-direction and the z-direction, and the electrical terminals (14, 16) are oriented parallel to the third sidewall or the fourth sidewall.

6. The sealed cable connector according to claim 1, wherein at least one anti-interference filter (24) is housed in the cavity (22*a*) and is electrically connected to a pair of the electrical terminals (14, 16) by crimping.

7. A manufacturing method for a sealed cable connector, comprising the steps of:

a) connecting end portions of a plurality of electric cables (18, 20) to end portions of a plurality of corresponding electrical terminals (14, 16);

b) molding an electrically insulating housing (12) onto the connected electric cables (18, 20) and the electrical terminals (14, 16), the electrically insulating housing (12) having a connection portion that is pluggable and unpluggable in a x-direction to and from a mating connector, and having a frame (22) with a cavity (22*a*) extending in a z-direction to house the connected end portions of the electric cables (18, 20) and the electrical terminals (14, 16), the cavity (22*a*) being delimited by the housing (12) in the x-direction and a y-direction, whereas the y-direction extends perpendicular to the x-direction and whereas the z-direction extends perpendicular the x-direction and the y-direction, and the electrical terminals (14, 16) have a planar shape in the cavity (22*a*) and are oriented in the x-direction and the z-direction;

c) mounting an upper cover (26) and a lower cover to two opposite sides of the cavity (22*a*), respectively, the upper cover (26) having an injection hole and an air outlet hole; and d) injecting an electrically isolating material into the cavity (22*a*) through the injection hole, so to seal the connected end portions of the electric cables (18, 20) and the electrical terminals (14, 16).

8. The manufacturing method according to claim 7, wherein, during the step b), the frame (22) has a first sidewall and a second sidewall which are opposite to each other and extend in the y-direction and the z-direction, a third sidewall and the fourth sidewall which are opposite to each other and extend in the x-direction and the z-direction, and the electrical terminals (14, 16) are oriented parallel to the third sidewall or the fourth sidewall.

9. The manufacturing method according to claim 7, wherein the end portions of the electric cables (18, 20) are electrically connected to the end portions of the corresponding electrical terminals (14, 16) by welding.

10. The manufacturing method according to claim 7, wherein the z-direction extends from one of the upper cover (26) and the lower cover towards the other of the upper cover (26) and the lower cover.

11. A sealed cable connector (10), comprising:

a plurality of electric cables (18, 20);

an electrically insulating housing (12) having a connection portion that is pluggable and unpluggable in a x-direction to and from a mating connector;

a plurality of electrical terminals (14, 16) that are mechanically connecting to the housing (12), each of the electrical terminals (14, 16) having an end portion that is electrically connected to an end portion of a corresponding electric cable (18, 20);

the housing (12) having a frame (22) forming a cavity (22*a*) that extends in a z-direction and is delimited by the housing (12) in the x-direction and a y-direction, whereas the y-direction extends perpendicular to the x-direction and whereas the z-direction extends perpendicular the x-direction and the y-direction, wherein connected end portions of the electric cables (18, 20) and the electrical terminals (14, 16) are provided within in the cavity (22*a*) of the frame (22);

wherein, the electrical terminals (14, 16) have a planar shape in the cavity (22*a*) and are oriented in the x-direction and the z-direction, the housing (12) is molded onto the connected electric cables (18, 20) and the electrical terminals (14, 16), an electrically isolating material is injected into the cavity (22*a*) to seal the connected end portions of the electric cables (18, 20) and the electrical terminals (14, 16), and at least one anti-interference filter (24) is housed in the cavity (22*a*) and is electrically connected to a pair of the electrical terminals (14, 16) by crimping.

* * * * *